US005998770A

United States Patent [19]
Sundby

[11] Patent Number: 5,998,770
[45] Date of Patent: Dec. 7, 1999

[54] HEATED AUTOMOTIVE BED LINER

[76] Inventor: Jeffrey V. Sundby, 823 S. 512 St., Grand Forks, N. Dak. 58201

[21] Appl. No.: 08/991,512

[22] Filed: Dec. 16, 1997

[51] Int. Cl.$^{6}$ .................... B60L 1/02; H05B 3/34
[52] U.S. Cl. .................... 219/528; 219/202
[58] Field of Search .................... 219/528, 529, 219/520; 338/259; 607/149; 428/71

[56] References Cited

U.S. PATENT DOCUMENTS

| | | | |
|---|---|---|---|
| 4,250,397 | 2/1981 | Gray et al. | 219/345 |
| 4,333,678 | 6/1982 | Munoz et al. | 296/29 R |
| 4,629,868 | 12/1986 | Svensson | 219/528 |
| 4,825,048 | 4/1989 | Altmann et al. | 219/528 |
| 4,868,898 | 9/1989 | Seto | 219/528 |
| 4,954,670 | 9/1990 | Jensen et al. | 174/92 |
| 5,218,185 | 6/1993 | Gross | 219/528 |
| 5,276,310 | 1/1994 | Schmidt | 219/521 |
| 5,308,133 | 5/1994 | Mangum et al. | 296/39.2 |
| 5,806,909 | 9/1998 | Wise | 296/39.1 |
| 5,854,470 | 12/1998 | Silva | 219/528 |

*Primary Examiner*—Tu Ba Hoang
*Assistant Examiner*—Daniel Robinson
*Attorney, Agent, or Firm*—Goldstein & Canino

[57] ABSTRACT

The invention is a heated automotive bed liner which utilizes electrical power to provide the heat necessary to keep the goods inside an automotive vehicle from freezing in cold weather. The device comprises an upper layer and a lower layer—each layer being made of electrically non-conductive material, and electrically resistive heating wires placed between the upper layer and the lower layer. When the heating wires receive power from an electrical power supply, they generate heat, thereby providing heat to the goods placed on the bed liner as well as the surrounding air inside the vehicle.

8 Claims, 2 Drawing Sheets

HEATED AUTOMOTIVE BED LINER

BACKGROUND OF THE INVENTION

The invention relates to a heated automotive bed liner for trucks, vans, buses, or any other motor vehicles designed to carry heavy loads. More particularly, the invention relates to an automotive bed liner that is electrically heated to prevent freezing of equipment and goods inside the vehicle during cold weather.

Many trucks, vans and buses are used to transport equipment and goods that are vulnerable to cold temperatures. During transportation, such equipment and goods may freeze, resulting in damage when they are exposed to cold weather for a prolonged period of time.

The problem of freezing arises not only during transportation but also during prolonged parking. Equipment and goods inside the vehicle are susceptible to freeze-ups especially when the vehicle is parked overnight. For this very reason, many people waste valuable time unloading their vehicle every time it is parked overnight. For a long time, people have desired a device that can prevent the equipment and goods inside their vehicle from freezing and thus eliminate the hassle of unloading and loading their vehicle everyday. However, no such device exists today that addresses this specific need.

While various prior art references disclose electrical heated mat-like devices, no device has been specifically designed for use in a motor vehicle to prevent freezing of equipment and goods inside the vehicle. U.S. Pat. No. 5,380,988 to Dyer discloses a heated mat structure for melting ice and snow on heavy foot traffic areas. Likewise, U.S. Pat. No. 5,291,000 to Hornberger discloses a heater mat apparatus for melting snow surrounding an automobile to accommodate access. In addition to their structural differences, these inventions are specifically designed for outdoor use, mainly for the purpose of melting ice and snow. Consequently, they are not suitable for use on automotive vehicles since they do not address the unique needs associated with providing heat to equipment and goods inside the vehicles.

U.S. Pat. No. 5,254,384 to Gordon discloses a heatable car floor mat for the purpose of reducing damages to the floor caused by snow, water, mud and road salts. The duplex floor mat has a porous mat supported by a reservoir to permit water and road salt to flow through the porous mat into the reservoir. The floor mat is connectable to a heater vent of the vehicle in an effort to accelerate the process of evaporating water trapped in the reservoir. Although the device may be effective in keeping the floor of an automobile dry, it is not effective in preventing goods from freezing during transportation. In addition, many trucks, vans and buses do not have heating vents that reach far enough in the back area where the most of the goods are usually carried. Furthermore, the device to Gordon does not solve the problem of freeze-up when the automobile is parked.

While these units mentioned above may be suitable for the particular purpose employed, or for general use, they would not be as suitable for the purposes of the present invention as disclosed hereafter.

SUMMARY OF THE INVENTION

It is an object of the invention to produce a heated automotive bed liner for trucks, vans, and the like which utilizes electrical power from a car battery to heat the bed liner and thus eliminate freezing of equipment and goods during transportation.

It is another object of the invention to produce a heated automotive bed liner that can be plugged into an ordinary household 120 volt power supply when the vehicle is not in use, thereby allowing users to save valuable time by leaving the equipment and goods on the heated automotive bed liner inside the vehicle without worrying about the possibility of damages caused by freezing.

It is yet another object of the invention to produce a heated automotive bed liner that has wheel-well cutouts to fit neatly around the wheel-wells so that the heated automotive bed liner will lay flat on substantially the entire area of the bed of a automotive vehicle such as truck or van, etc.

It is further object of the invention to produce a heated automotive bed liner with a heater control unit which allows the user to manually select various degrees of heat to be provided by the bed liner.

It is still further object of the invention to produce a heated automotive bed liner with water channels to help evacuate liquids.

The invention is a heated automotive bed liner which utilizes electrical power to provide the heat necessary to keep the goods inside an automotive vehicle from freezing in cold weather. The device comprises an upper layer and a lower layer—each layer being made of electrically non-conductive material, and electrically resistive heating wires placed between the upper layer and the lower layer. When the heating wires receive power from an electrical power supply, they generate heat, thereby providing heat to the goods placed on the bed liner as well as the surrounding air inside the vehicle.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
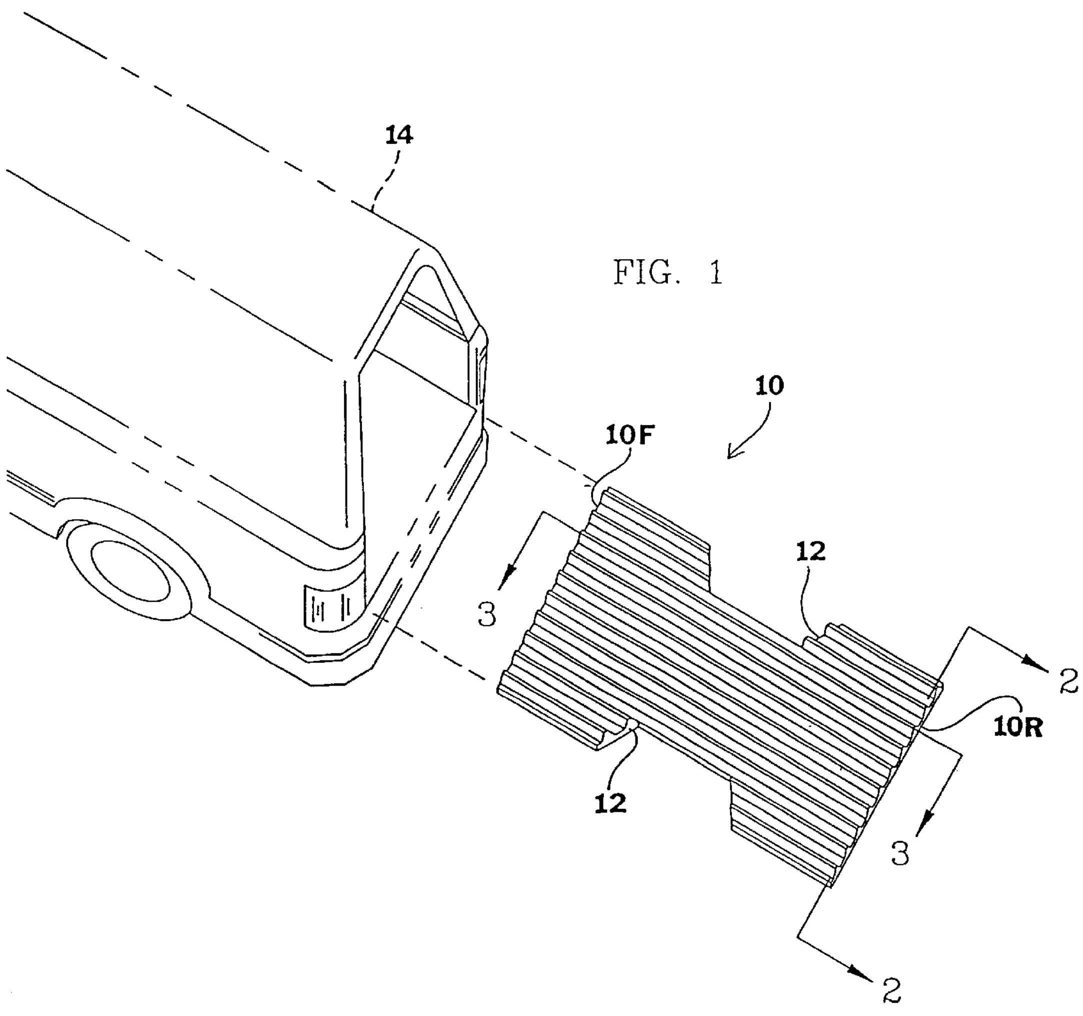
FIG. 1 is a diagrammatic perspective view of the instant invention.

FIG. 1 illustrates a heated automotive bed liner 10 having an overall rectangular shape including a bed liner front 10F and bed liner rear 10R, and having wheel-well cutouts 12 to fit around wheel-wells of a truck 14. The simplicity of the heated automotive bed liner 10, provided in one piece structure for covering substantially the entire surface of the bed of the truck 14, allows quick and convenient installation. In addition, the snug fit around the wheel-wells prevents the liner 10 from moving around in the back of the truck 14 without requiring additional attachment means to secure the bed liner 10.

Figure 2:
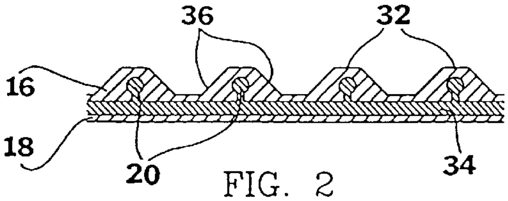
FIG. 2 is a cross-sectional view, taken on line 2—2 of FIG. 1 of the instant invention.
Figure 3:
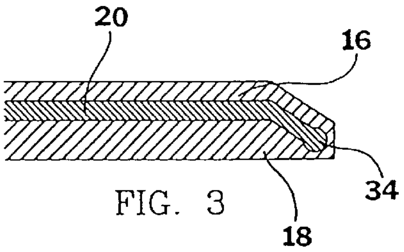
FIG. 3 is a cross-sectional view, taken on line 3—3 of FIG. 1 of the instant invention.

FIGS. 2 and 3 show the heating bed liner 10 further comprising an upper layer 16 and a lower layer 18 made of electrically non-conductive material such as hardened rubber or plastic. The upper and lower layers 16 and 18 should be made of sufficiently durable material to withstand the force of ordinary use such as loading and unloading of heavy equipment and goods without risk of an accidental short circuit.

As shown in FIG. 2, in a preferred embodiment, the upper layer 16 comprises a plurality of parallel ribs 32, extending upwardly from the lower layer 18 longitudinally along the bed liner 10 between the front 10F and rear 10R. The plurality of parallel ribs 32 form water channels 36 which help evacuate liquids. Electrically resistive metallic heating wires 20, each extending through one of the ribs, are substantially uniformly distributed over the entire bed liner, and are substantially parallel to each other.

In an alternate embodiment, where the upper layer has a flat surface without the ribs, the heating wires are placed between the upper layer and the lower layer. The heating wires extends longitudinally between the front and rear and are substantially uniformly distributed over the entire bed liner, and are substantially parallel to each other. The upper and lower layers are structurally interconnected by mechanical joinder.

Figure 4:
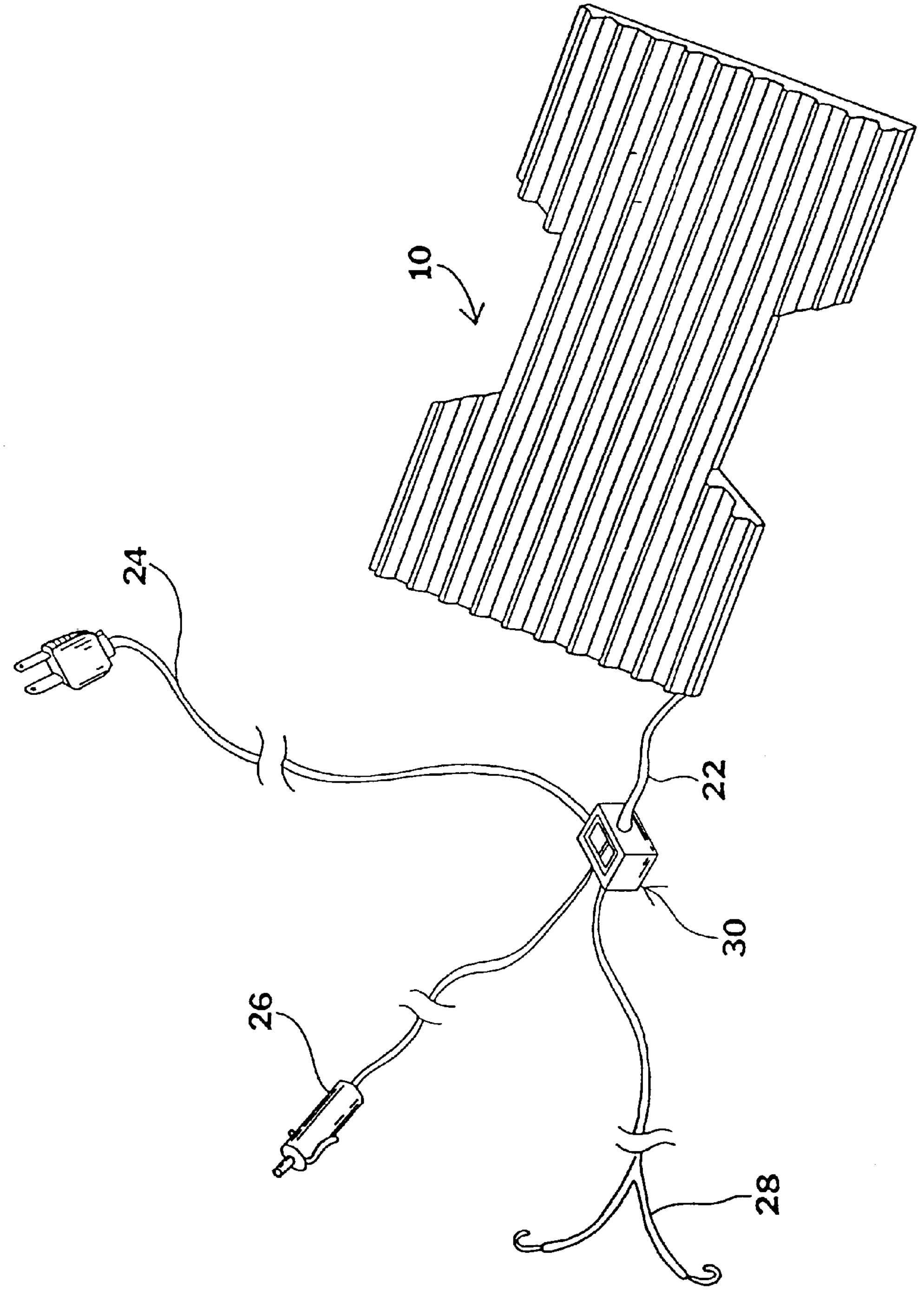
FIG. 4 is a diagrammatic perspective view of the instant invention.

FIG. 4 illustrates various connectors for releasably interconnecting to different electrical power supplies directing electrical energy to the bed liner 10—a line connector 24 for connection to an ordinary 120 volt household outlet, a cigarette lighter connector 26 for connection to the vehicle's cigarette lighter power supply, and a double lead connector 28 for direct connection to the vehicle's battery.

The heated automotive bed liner 10 also includes a heater control unit 30 connected between the various connectors 24, 26, and 28 and a power supply cord 22 for allowing one to manually select the amount of heat to be provided by the heated automotive bed liner 10. The control unit 30 may include a step-down transformer for voltage conversion when used with the line connector 24, and a thermostat and temperature setting controls for selectively switching the heating wires 20 on and off according to the settings and current temperature at the control unit 30.

The heated automotive bed liner 10 also includes bus conductors 34 connected in series to the power supply cord 22 which supplies power from the heater control unit 30. The bus conductors 34 extend along the front 10F and rear 10R of the bed liner 10. Some connection must be made between the power supply cord and the bus conductor along the rear. This connection can be a single wire extending along a side or beneath the bed liner 10, or can take any other form as would be appreciated by those skilled in the art. Each of the heating wires 20 are electrically connected in parallel between the bus conductors 34.

The heating wires 20 have resistive property which generate heat when electric currents are passed through them. The heat released from the heating wires raises the temperature of the upper and lower layers 16 and 18, thereby providing heat to the objects placed on the bed liner 10 and the surrounding air by conduction and convection. The upper layer 16 should preferably have higher thermal conductivity than the lower layer 18 to allow more heat to dissipate upwardly rather than downwardly through the lower layer 18.

When goods are being transported in cold weather, the heated automotive bed liner is connected to the vehicle's battery either directly or through the cigarette lighter. The heat from the bed liner warms the goods and the surrounding air inside the vehicle preventing the goods from freezing. When the vehicle is not being used, the heated automotive bed liner can be plugged into a household 120 volt power supply. Thus, rather than unloading the goods only to reload them later, one may save valuable time by leaving their goods on the heated automotive bed liner.

While the above description contains many specificities, these should not be construed as limitation on the scope of the invention, but rather as examples of preferred embodiments. Many other variations are possible. For example, the size and shape of the heated automotive bed liner may vary to conform to the size and shape of different automotive vehicle models and types.

What is claimed is:

1. A heated automotive bed liner for providing heat to keep goods inside an automotive vehicle from freezing in cold weather, comprising:

a) an upper layer and a lower layer, each layer having a bed liner front and a bed liner rear, each layer made of electrically non-conductive material, said upper layer and said lower layer structurally connected;

b) electrically resistive heating wires placed between the upper layer and the lower layer, each of said heating wires being substantially parallel to each other extending longitudinally between said front and said rear;

c) two bus conductors, extending along the front and the rear, each of said heating wires electrically connected in parallel between said bus conductors; and d) a power supply cord, said power supply cord connected to the bus connectors for supplying power to the bus connectors.

2. The heated automotive bed liner of claim 1, further comprising wheel-well cutouts to fit around the wheel-wells of the automotive vehicle.

3. The heater automotive bed liner of claim 2, further comprising connectors, attached to the power cord, further comprising:

a) a line connector for connection to an ordinary 120 volt household outlet;

b) a cigarette lighter connector for connection to the vehicle's cigarette lighter power supply; and c) a double lead connector for direct connection to the vehicle's battery.

4. The heated automotive bed liner of claim 3, further comprising a heater control unit connected between the connectors and the power supply cord, wherein said heater control unit comprises:

a) a transformer means for step-down voltage conversion when the line connector is used as the power source; and b) a temperature setting control means for selectively switching the heating wires on and off when predetermined temperatures are reached.

5. A heated automotive bed liner for providing heat to keep goods inside an automotive vehicle from freezing in cold weather, comprising:

a) an upper layer and a lower layer, each layer having a front and a rear, each layer made of electrically non-conductive material, said upper layer comprising a plurality of parallel ribs, extending upwardly from the lower layer longitudinally between said front and said rear;

b) electrically resistive heating wires, one of said heating wires extending through each of the ribs;

c) two bus conductors, extending along the front and the rear, each of said heating wires electrically connected in parallel between said bus conductors; and d) a power supply cord, said power supply cord connected to the bus connectors for supplying power to the bus connectors.

6. The heated automotive bed liner of claim 5, further comprising wheel-well cutouts to fit around the wheel-wells of the automotive vehicle.

7. The heater automotive bed liner of claim 6, further comprising connectors, attached to the power cord, further comprising:

a) a line connector for connection to an ordinary 120 volt household outlet;

b) a cigarette lighter connector for connection to the vehicle's cigarette lighter power supply; and c) a double lead connector for direct connection to the vehicle's battery.

8. The heated automotive bed liner of claim 7, further comprising a heater control unit connected between the connectors and the power supply cord, wherein said heater control unit comprises:

a) a transformer means for step-down voltage conversion when the line connector is used as the power source; and b) a temperature setting control means for selectively switching the heating wires on and off when predetermined temperatures are reached.

* * * * *